Aug. 15, 1939.  W. VAN B. ROBERTS  2,169,374
OSCILLATION GENERATION SYSTEM
Filed Jan. 4, 1937

INVENTOR
WALTER VAN B. ROBERTS
BY
ATTORNEY

Patented Aug. 15, 1939

2,169,374

UNITED STATES PATENT OFFICE 2,169,374

OSCILLATION GENERATION SYSTEM

Walter van B. Roberts, Princeton, N. J., assignor to Radio Corporation of America, a corporation of Delaware Application January 4, 1937, Serial No. 118,943

11 Claims. (Cl. 250—36)

The present invention relates to electron discharge device oscillation generators, and has for its main object to provide a novel method of and means for stabilizing the frequency of an oscillation generator. The invention finds particular application to short wave generators whose frequency of oscillation is too high to be practically controlled by a piezo electric crystal without using a great many stages of frequency multiplication.

Essentially, the present invention is based upon the employment, as the frequency stabilizing means, of a beam of electromagnetic waves traversing a path which is relatively long compared with the wavelength of oscillations generated so that a very small percentage change in the wavelength will produce a relatively great change in the relation between the phase at one end of the path and the phase at the other end of the path.

Figure 1:
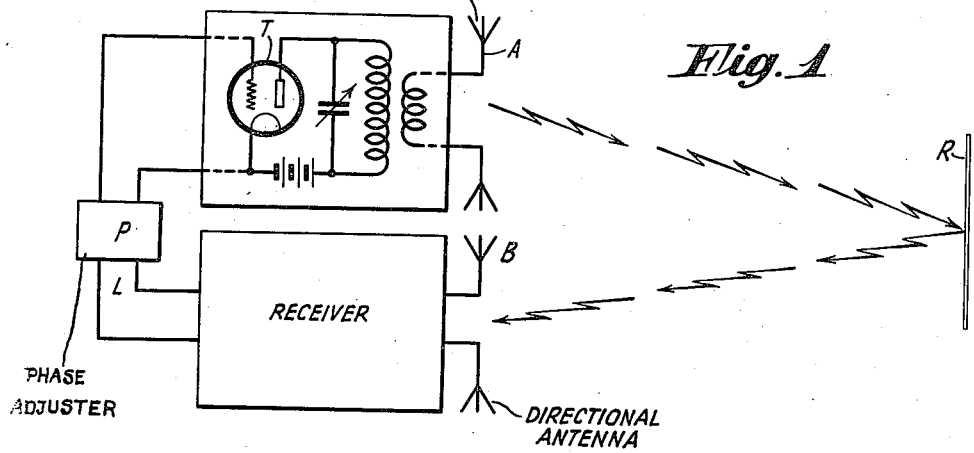
Figure 2:
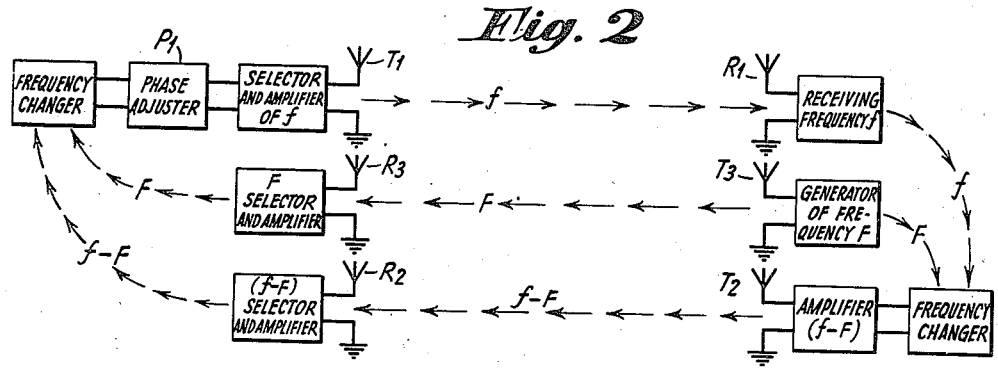
Figure 3:
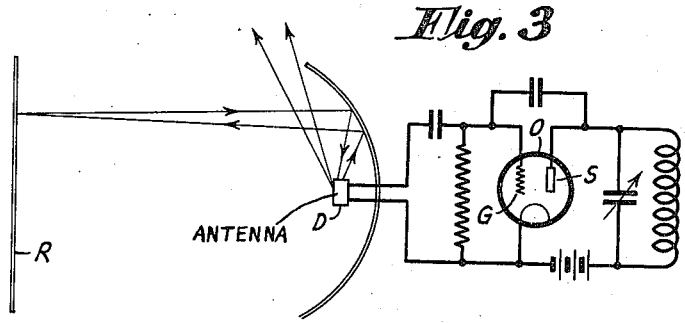

A more detailed description of the invention follows in conjunction with the accompanying drawing, wherein:

Fig. 1 shows one method of utilizing a beam of electromagnetic waves in accordance with the principle of the invention, and Figs. 2 and 3 show modifications employing the principle of the invention.

Referring to Fig. 1, there is shown, schematically, a vacuum tube amplifier T whose output energy is radiated preferably as directionally as possible over a suitable directional antenna A to a remote reflector R which is located a considerable number of wavelengths away from antenna A. Reflector R is designed and suitably disposed to reflect the energy picked up from A toward a directional receiving antenna B and associated apparatus, the antenna B being carefully arranged by means well known in the art to minimize direct pick-up from transmitter T. The receiver does not require a detector but includes sufficient amplification so that its output when fed back to transmitting vacuum tube T by means of transmission line L will supply the excitation for the grid of tube T which is required to produce the output originally assumed from vacuum tube T. If desired, the received frequency may be heterodyned in the receiver to a much lower frequency to permit more efficient transmission over the line L. Between the output of line L and the grid circuit of tube T, this low frequency is heterodyned back to the original high frequency by means of a voltage derived from the same source as utilized for the first heterodyne action.

A phase adjuster P is included in the transmission line to permit adjusting the phase of the excitation for optimum output from tube T. The stabilizing of frequency is obtained as follows: The amount of feed back to the tube T is reduced until oscillation is maintained only when the phase of the feed back lies within a somewhat narrow range. Under these conditions, any change in frequency produces a change in feed back phase which is proportional to the total length of path traversed by the radiation from transmitting antenna A to reflector R and back to receiving antenna B. It is preferred that this total length of path be a plurality of wavelengths of the wave transmitted by tube T, although it will be understood that the invention is not limited to any particular length of path. Hence by locating reflector R as far away as practical, the frequency of oscillation is held within narrow limits, which limits are furthermore independent of temperature, inasmuch as the stabilizing element, being merely a matter of distance, is not subject to change.

Fig. 2 is in principle the same as Fig. 1 but is arranged to avoid a difficulty which can arise in Fig. 1 if the receiving antenna B picks up too much energy direct from the transmitting antenna A. In Fig. 2 a frequency $f$ is radiated from antenna $T_1$ and received at a remote point by antenna $R_1$. At the remote point the received frequency $f$ is combined with a locally generated frequency $F$ to form a different frequency $f-F$ which is amplified and radiated from antenna $T_2$ and picked up by antenna $R_2$ located not far from the transmitter $T_1$. At the same time the local generator of oscillations of frequency $F$, which is located at the remote point, is coupled with a transmitting antenna $T_3$ so as to transmit radiation of frequency $F$ which is picked up by a receiving antenna $R_3$ located not far from the transmitter $T_1$. The two signals of frequency $f-F$ and $F$, picked up respectively by antenna $R_2$ and $R_3$, are separately selected and amplified, and then combined in a frequency changer to produce a beat frequency $f$ which is then passed through a phase adjuster $P'$ and an amplifier and finally utilized to excite the final amplifier feeding antenna $T_1$.

Thus the final result is that the amplifier whose output, by way of antenna $T_1$, radiates energy, has its input excited by a portion of the output energy returning from a remote point. The only difference between this arrangement and that of Fig. 1 is that by having the three radiated frequencies different from each other, it is possible to receive them on sufficiently selective receivers so that no energy of frequency $f$ is fed back from the antenna $T_1$ to the input of its associated amplifier without traveling to the remote point and back again. The theory of stabilization and the method of adjustment is similar to what has been explained in connection with Fig. 1.

Fig. 3 shows a method somewhat different in principle from that of Figs. 1 and 2 but which ultimately depends upon the same greatly increased sensitiveness to change in frequency shown by the phase of the feed back of the oscillation generator. In this figure a common type of oscillatory circuit is used wherein there is a certain amount of capacity between grid G and plate S of a vacuum tube O, and there is also inductive reactance in both the grid and the plate circuits. When a crystal is used in the grid circuit, this is a well known crystal oscillator. In the present case, however, a small dipole antenna D is connected near the grid circuit in place of a crystal. Ordinarily such a dipole would possess only a radiation resistance at its resonant frequency. This resistance is a measure of the energy leaving the dipole never to return. However, by providing a reflector R at a remote point which reflects a considerable portion of the radiated energy back into the dipole, the effective impedance of the dipole is altered in magnitude and in phase (that is, the effective or apparent resistance, the apparent reactance, and their ratio are variable), the phase depending upon the total length of path of the reflected radiation and the magnitude depending upon the proportion of the total radiated energy which is reflected back upon the dipole. In order to make this proportion large, it is preferable to employ the most effective reflectors possible at each end of the path. Since the nature or phase of the effective impedance of the dipole and the grid circuit depends, as above explained, upon the length of path, the oscillation frequency is stabilized to a range of frequencies wherein the effective reactance of the dipole is inductive. This range is smaller the greater the length of path.

While I have illustrated one method of utilizing an impedance whose nature is determined by the path length of radiation, I do not wish to be limited to this particular arrangement except to the extent indicated in the following claims. Nor is the invention limited by the precise arrangements shown in the drawing, since various modifications may be made without departing from the spirit and scope thereof.

Throughout the specification and claims the term "reflector" is not to be limited to a plain sheet of metal but is intended to include any remotely located circuit for returning by deflection toward the transmitting point radiant energy of an intensity proportional to the transmitted radiant energy impinged upon said reflector.

What is claimed is:

1. The method of operating a vacuum tube having an input circuit and an output circuit which comprises radiating waves from said output circuit toward a distant point, reflecting said waves at said distant point in the form of space radiation back toward said tube, separately receiving said reflected waves and supplying said input circuit with said waves in such phase as to produce maximum output from said tube.

2. The method of operating a vacuum tube oscillator which comprises radiating at least a portion of the oscillatory energy, and reflecting the radiated energy back toward said oscillator in the form of space radiation from such a distance and applying same to said oscillator such that the reflected energy stabilizes the frequency of the oscillating energy within a narrow range of frequencies.

3. The method of operating a vacuum tube having an input circuit and an output circuit which comprises radiating waves from said output circuit, reflecting said waves back toward said tube in the form of space radiation from a distance at least a plurality of wavelengths away from said tube, separately receiving said waves and supplying same to said input circuit in such phase as to produce maximum output from said tube.

4. An oscillation generator system comprising an electron discharge device amplifier having an output circuit and an input circuit, a first directional antenna coupled to said output circuit, a second directional antenna coupled to said input circuit, said first and second antennas being so constructed and arranged as to minimize direct radiation therebetween, and a reflector located at a distance which is at least as great as the length of the operating wave from both said antennas, said first antenna being arranged to predominantly transmit waves toward said reflector, and said second antenna being arranged predominantly to receive waves reflected by said reflector.

5. An oscillator circuit comprising an electron discharge device having a grid, plate and cathode, a feed-back path between said plate and grid, an antenna connected to said grid and cathode, a first reflector arranged to focus the waves radiated from said antenna outwardly, a second reflector located at a predetermined distance from said first reflector for receiving the waves radiated from said antenna and for reflecting same back upon said first reflector and antenna in such phase as to stabilize the frequency of oscillations of said device within a narrow range of frequencies.

6. An oscillator circuit in accordance with claim 5, characterized in this that said two reflectors are separated from each other by a distance at least a plurality of wavelengths at the frequency of the oscillator.

7. An oscillation generator system comprising an electron discharge device amplifier having an output circuit and in input circuit, a first directional antenna coupled to said output circuit, a second directional antenna coupled to said input circuit, a receiver and a phase adjuster in the order named located between said second directional antenna and said input circuit, and a reflector located at a distance from both said antennas, said first antenna being arranged to transmit waves toward said reflector, and said second antenna being arranged to receive waves reflected by said reflector.

8. An oscillator circuit comprising an electron discharge device having a grid, plate and cathode, a feed-back path between said plate and grid, an antenna connected to said grid and cathode, a parabolic reflector arranged to focus outwardly the waves radiated from said antenna, a planar reflector located at a predetermined distance from said first reflector for receiving the waves radiated from said antenna and for reflecting same back upon said first reflector and antenna in such phase as to stabilize the frequency of oscillations of said device within a narrow range of frequencies.

9. An oscillator circuit comprising an electron discharge device having a grid, plate and cathode, a feed-back path between said plate and grid, a dipole antenna connected to said grid and cathode, a first reflector arranged to focus the waves radiated from said antenna outwardly, a second reflector located at a predetermined distance from said first reflector for receiving the waves radiated from said antenna and for reflecting same back upon said first reflector and antenna in such phase as to stabilize the frequency of oscillations of said device within a narrow range of frequencies, the magnitude of the effective impedance of said dipole antenna being dependent upon the length of path of the reflected energy between said first and second reflectors and the proportion of the total radiated energy reflected back upon said dipole.

10. An oscillation generator system comprising an electron discharge device amplifier having an output circuit and an input circuit, a first directional antenna coupled to said output circuit, a second directional antenna coupled to said input circuit, a receiver and a phase adjuster in the order named located between said second directional antenna and said input circuit, and a planar reflector located at a distance which is at least twice as great as the length of the operating wave from both said antennas, said first antenna being arranged to transmit waves toward said reflector, and said second antenna being arranged to receive waves reflected by said reflector.

11. In a frequency controlling circuit, an impedance element having apparent impedance dependent upon reflected radiant energy, comprising a radiating member, a remote reflecting member separated from said radiating member solely by ethereal space, and means for concentrating the radiated energy upon said reflector and for concentrating the reflected energy upon said radiating member, whereby the ratio of apparent reactance to apparent resistance of said radiating member is dependent in part upon the radiation energy in the ethereal space between said radiating member and reflector and is a periodic function of the distance therebetween.

WALTER van B. ROBERTS.